US005600840A

United States Patent [19]
Pearce et al.

[11] Patent Number: 5,600,840
[45] Date of Patent: Feb. 4, 1997

[54] AUTOMATIC ADJUSTMENT OF DISK SPACE REQUIRED FOR SUSPEND-TO-DISK OPERATION

[75] Inventors: John J. Pearce, Del Valle; Kendall Witte, Austin, both of Tex.

[73] Assignee: Dell USA, L.P., Austin, Tex.

[21] Appl. No.: 370,595

[22] Filed: Jan. 10, 1995

[51] Int. Cl.$^6$ .................................................. G06F 12/16
[52] U.S. Cl. ............................................ 395/750; 395/488
[58] Field of Search .............................. 364/707; 395/750, 395/700, 497.04, 497.02, 497.01, 492, 488, 489, 439; 365/227, 228, 229

[56] References Cited

U.S. PATENT DOCUMENTS

| | | | |
|---|---|---|---|
| 5,136,711 | 8/1992 | Hugard | 395/700 |
| 5,386,552 | 1/1995 | Garney | 395/182.08 |
| 5,513,359 | 4/1996 | Clark | 395/750 |
| 5,539,879 | 7/1996 | Pearce | 395/184.01 |

OTHER PUBLICATIONS

The Design of the Unix Operating System, Maurice Bach, ISBN O-13-201799-7 025, 1986, pp. 22–24, 67–72.
Using the Operating System OS/2 Version 2.1, First Edition (May 1993), pp. 293–294.

Primary Examiner—Tod R. Swann
Assistant Examiner—Christopher S. Chow
Attorney, Agent, or Firm—Haynes and Boone, L.L.P.

[57] ABSTRACT

Method and apparatus for implementing S2D functions using a dedicated S2D partition of a fixed, minimum size, in combination with an extended partition of adjustable size are disclosed. In a preferred embodiment, a hierarchy of pointers is constructed for indicating the location of the blocks of disk space comprising the extended partition, which may be located in a native OS partition of the hard disk, some other available space on the hard disk, or both, and may or may not comprise contiguous hard disk space. A root block stored in the S2D partition comprises a plurality of pointers, each of which indicate the location of a pointer block. Each pointer block comprises a plurality of pointers, each of which point to a data block. When an S2D operation is initiated, an S2D utility continuously locates a next available data block in the S2D partition or extended partition, using the entries in the root block and pointer blocks, and writes a portion of RAM to the located block until the entire RAM is saved to the hard disk. Upon returning from the S2D operation, the process is performed in reverse. In one aspect of the invention, an MKS2D utility fills in the root and pointer blocks and reserves the data blocks for use by the S2D utility. In another aspect of the invention, an RMS2D utility deletes the extended partition and returns the data blocks previously allocated thereto to the native OS and/or other partition(s).

29 Claims, 4 Drawing Sheets

AUTOMATIC ADJUSTMENT OF DISK SPACE REQUIRED FOR SUSPEND-TO-DISK OPERATION

TECHNICAL FIELD

The invention relates generally to "suspend-to-disk" (S2D) capabilities and, more particularly, to a technique for enabling the automatic adjustment of disk space need implementing S2D capabilities.

BACKGROUND OF THE INVENTION

Portable personal computers (PCs) were first introduced in the early 1980s and have since enjoyed great commercial success and consumer acceptance. As the portable PC market has grown, users have begun to demand lighter weight, lower volume PCs that can be used for longer periods of time between battery charges. Meeting these demands has proved challenging in view of the fact that most portable PCs now support peripheral devices previously available only on desktop PCs. The additional peripherals greatly increase overall power consumption, making it difficult to achieve an optimal level of functionality while maintaining an acceptable battery life. Furthermore, although for reasons other than maximizing battery life, it has become desirable to more efficiently manage power consumption of desktop PCs in order to minimize overall operating costs Because many of the components and peripheral devices of both desktop and portable PCs consume a great deal of power even when they are idle, power management systems have been developed which cause each component or peripheral device to operate in the lowest power consumption mode with respect to present demands on the system. For example, many computers are capable of operating in several different reduced power consumption modes, such as "standby" and "suspend-to-disk" (S2D).

Standby mode essentially puts the PC to sleep by slowing the processor and system clock, turning off the LCD backlight and stopping hard drive activity. Alternatively, S2D mode saves the current system status, including device states, application program status, and the like, by writing the contents of RAM to the hard disk, at which point power is removed from all devices. When work is resumed, the hard drive copy is copied back to the RAM and operation resumes from the point at which it was interrupted.

Successful implementation of S2D requires that there be sufficient space available on the hard disk at the time an S2D is initiated to accommodate storage of the entire system RAM. Clearly, therefore, a significant obstacle confronting PC manufacturers is how to guarantee that, at any given time, there will be sufficient space on the hard disk to implement S2D. One solution to this problem has been to configure the hard disk to include an S2D partition of a fixed size sufficient to accommodate the amount of system RAM initially installed in the PC. While this solution is viable in some instances, for example, where a user does not intend to install additional RAM into the PC, it is deficient in two major respects. First, because the S2D partition is fixed, the hard disk area allocated to the S2D partition is unavailable for use by the native operating system (OS) of the PC, thereby reducing the effective hard disk size with respect to the native OS. Moreover, if additional RAM is installed in the PC, the S2D partition must be enlarged accordingly. Enlarging the S2D partition entails downloading the contents of the entire hard disk to floppy disks so that the hard disk can be reconfigured to have a larger S2D partition and then reloading the hard disk contents back to the hard disk. Clearly, this process is undesirably time-consuming and somewhat risky, as it is would not be inconceivable for data to be lost during the downloading/reloading process.

Another solution has been to allocate to the S2D function a file in the native OS partition in which to store the system RAM during an S2D operation. This solution is also deficient in that, if additional RAM is installed in the PC, the file will likely not be large enough to store the contents of the larger RAM, thereby rendering the S2D function inoperable. This obviously presents problems where a user expects to be able to utilize S2D functions and then suddenly discovers that he or she cannot. Moreover, a user is given no advance warning as to when S2D functions are and are not available for use. Therefore, what is needed is method of implementing S2D operations that ensures the availability of sufficient hard disk space at any given time, while not unduly restricting the amount of hard disk space available to and useable by the native OS of the PC.

SUMMARY OF THE INVENTION

The foregoing problems are solved and a technical advance is achieved by method and apparatus for implementing S2D functions using a dedicated S2D partition of a fixed, minimum size, in combination with an extended partition of adjustable size. In a departure from the art, entries in an S2D root block stored in the S2D partition point to blocks of hard disk space comprising the extended partition. The extended partition may be located in a native OS partition of the hard disk some other available space on the hard disk, or both, and may or may not comprise contiguous hard disk space.

In a preferred embodiment, a hierarchy of pointers is constructed for indicating the location of the blocks of disk space comprising the extended partition. The S2D root block comprises a plurality of pointers, each of which indicate the location of a pointer block. Similarly, each pointer block comprises a plurality of pointers each of which point to a data block. When an S2D operation is initiated, an S2D utility locates a next available data block in the S2D partition or extended partition, using the entries in the root block and pointer blocks, and writes a portion of RAM to the located block. This process continues until the entire RAM is saved to the hard disk. Upon returning from the S2D operation, the process is performed in reverse, with the contents of the data blocks indicated by the root block and pointer block entries being rewritten to the appropriate location in system RAM.

In one aspect of the invention, an MKS2D utility fills in the root and pointer blocks and reserves the data blocks for use by the S2D utility as follows. When the MKS2D utility is implemented, it computes the size of the extended partition needed, taking into account the amount of RAM installed in the PC, as well as the size of the S2D partition. The native OS is then used to write an "extent file" the size of the extended partition needed with some known pattern. At that point, the utility enters a loop wherein the hard disk is read to locate the next available block of the extent file and the root block and pointer blocks are filled in with pointers accordingly. In a preferred embodiment, the MKS2D utility may be run any time the hard disk needs to be reformatted with respect to S2D operations, such as when RAM is added to or removed from the PC.

In another aspect of the invention, an RMS2D utility deletes the extended partition and returns the data blocks previously allocated thereto to the native OS and/or other partition(s). In a preferred embodiment, the RMS2D utility may be run any time by a user to disable S2D operations, thereby increasing the amount of hard disk space available to the native OS.

A technical advantage achieved with the invention is that it is OS-independent, in that the MKS2D and RMS2D utilities used to implement the invention can be ported to any OS.

Another technical advantage achieved with the invention is that it enables RAM to be installed in or removed from a PC and the hard disk appropriately repartitioned without the user having to download and subsequently reload the entire contents of the hard disk.

Yet another technical advantage achieved with the invention is that it enables a user to manage PC system resources more efficiently by selectively temporarily disabling and subsequently reenabling S2D functions without having to download and reload data from the hard disk and without permanently eliminating S2D capabilities.

DETAILED DESCRIPTION OF THE PREFERRED EMBODIMENT

Figure 1:
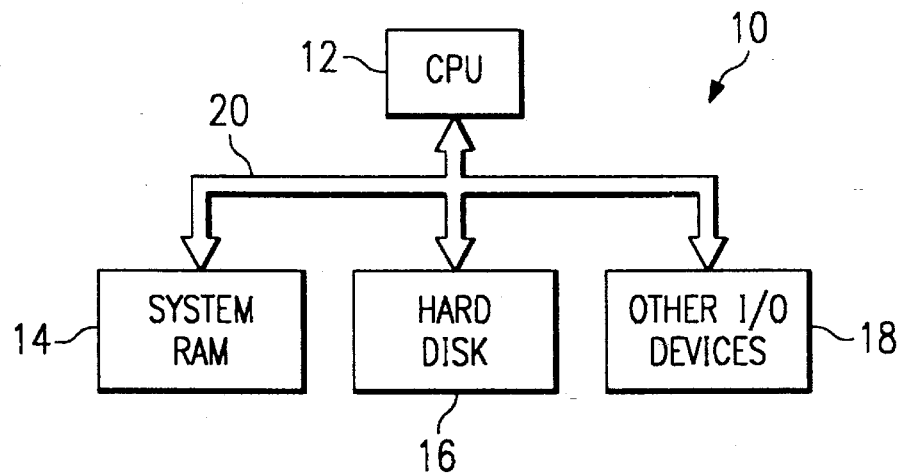
FIG. 1 is a block diagram of a PC for implementing a suspend-to-disk utility embodying features of the present invention.

Referring to FIG. 1, a personal computer (PC) capable of operating in a suspend-to-disk (S2D) mode is designated by a reference numeral 10. The PC 10 comprises a central processing unit (CPU) 12, system RAM 14, a hard disk 16 and other I/O devices, collectively designated by a reference numeral 18, all interconnected via a bus 20. Instructions comprising an MKS2D utility, an S2D utility and an RMS2D utility, which are described in detail below with reference to FIGS. 3, 5 and 6, respectively, are stored in a storage device, for example, on the hard disk 16 or a PROM (not shown), connected to the CPU 12. When an S2D operation is initiated, for example, by a user's pressing a designated key or button or by the elapse of a predetermined time period during which there has been no I/O activity, the contents of the RAM 14 are written to an S2D partition (FIG. 2A) and an extended partition (FIG. 4) of the hard disk 16. It should be noted that, while the RAM 14 initially comprises a first amount of memory, for example, 8 megabytes (MB), the size of the RAM 14 may be increased or decreased by a user according to his or her needs. As previously indicated, it is a feature of the present invention to enable the size of the RAM 14 to be selectively increased or decreased without requiring the user manually to reformat the disk 16 to perform S2D operations or to sacrifice the ability subsequently to utilize such operations.

Figure 2A:
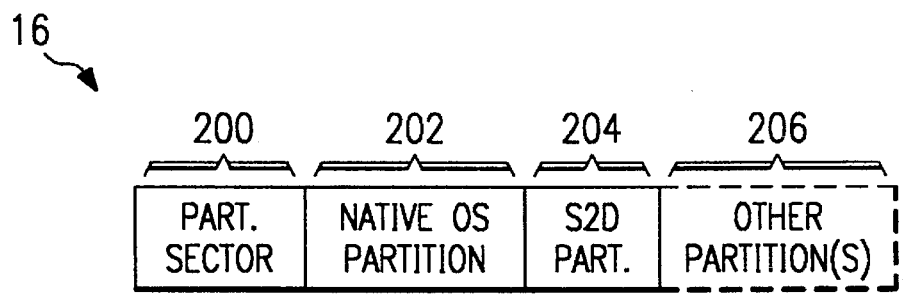
FIG. 2A is a block diagram illustrating the format of a hard disk of the PC of FIG. 1.

FIG. 2A is a block diagram of the format of the hard disk 16. It will be appreciated that the format of the hard disk 16 as shown in FIG. 2A is conventional in some respects and has been modified in others for the purposes of the present invention. The hard disk 16 includes a partition sector 200, which is the structure that all IBM compatible PCs use to define the partitions of a hard disk, as well as a native operating system (OS) partition 202. In accordance with the feature of the present invention, the hard disk also includes an S2D partition 204, which is of some minimum size necessary to store an S2D root block (FIG. 2C), as will be described. The hard disk 16 may also optionally include up to two additional partitions, collectively designated by a reference numeral 208, although the inclusion of such additional partitions 208 is not necessary to the operation of the present invention.

Figure 2B:
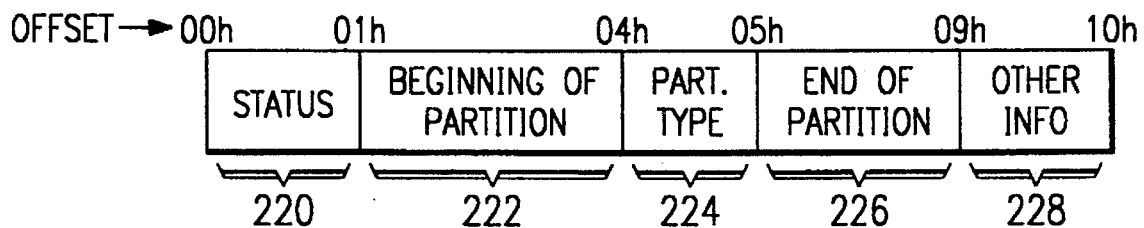
FIG. 2B is a block diagram illustrating the format of a partition table entry.

The partition sector 200 contains a partition table (not shown) comprising four table entries numbered 0 through 3, each of which correspond to a partition of the hard disk 16, such that, as previously implied, the hard disk 16 may be formatted to include up to four partitions. FIG. 2B illustrates the format of the partition table entries. As shown in FIG. 2B, a first field 220 of each entry indicates whether the partition associated with the entry is bootable. A second field 222 of each entry indicates the physical location of the beginning of the partition on the hard disk 16 in terms of head, sector and cylinder. A third field 224 of each entry indicates the system type of the partition; it is this field that is used to identify the entry associated with the S partition type; it is this, for example, native OS or S2D. A fourth field 226 of each entry indicates the physical location of the end of the partition on the hard disk 16 in terms of head, sector and cylinder. A remaining field 228 of each entry contains additional information about the partition. Typically, the first entry in the partition table (entry 0) defines the native OS partition 202. One of the remaining partition table entries, for example, entry 1, defines the S2D partition 204.

Figure 2C:
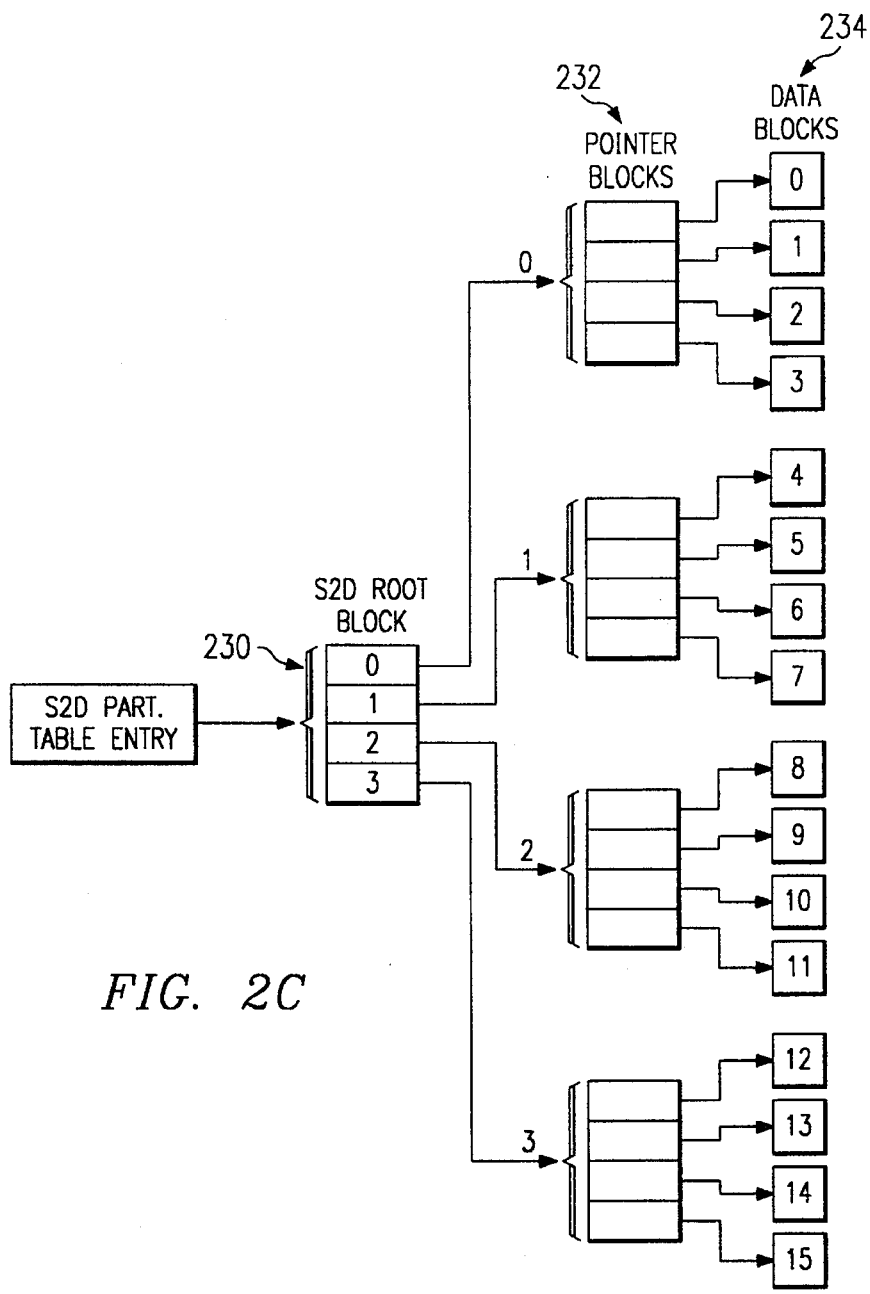
FIG. 2C is a block diagram of a hierarchy of pointers used in implementing the present invention.

In accordance with a feature of the present invention, an extended partition (FIG. 4) of the disk 16 is defined using a hierarchy of pointers to indicate the locations of available data blocks comprising the extended partition. Referring to FIG. 2C, as indicated above, an S2D partition table entry (entry 1), points to the S2D partition 204 (FIG. 2A). Located at the beginning of the S2D partition 204 is a root block 230 comprising m entries numbered 0 through (m−1), each of which point to one of m pointer blocks 232. Similarly, each of the m pointer blocks 232 comprises n entries numbered 0 through (n−1), where n may or may not be equal to m. Each of the n entries of each of the m pointer blocks point to one of a plurality of data blocks 234 comprising the extended partition (FIG. 4), such that the total number of data blocks 234 is equal to m*n. It should be noted that the number and size of the root, pointer and data blocks 230, 232 and 234, respectively, will be directly dependent on the size of the extended partition necessary to implement the S2D operations, as will be described below. In the embodiment illustrated in FIG. 2C, m and n are both equal to 4 and the total number of data blocks 234 is equal to 16. In the preferred embodiment, the data blocks are of a known, fixed size; however, this need not be the case.

Figure 3:
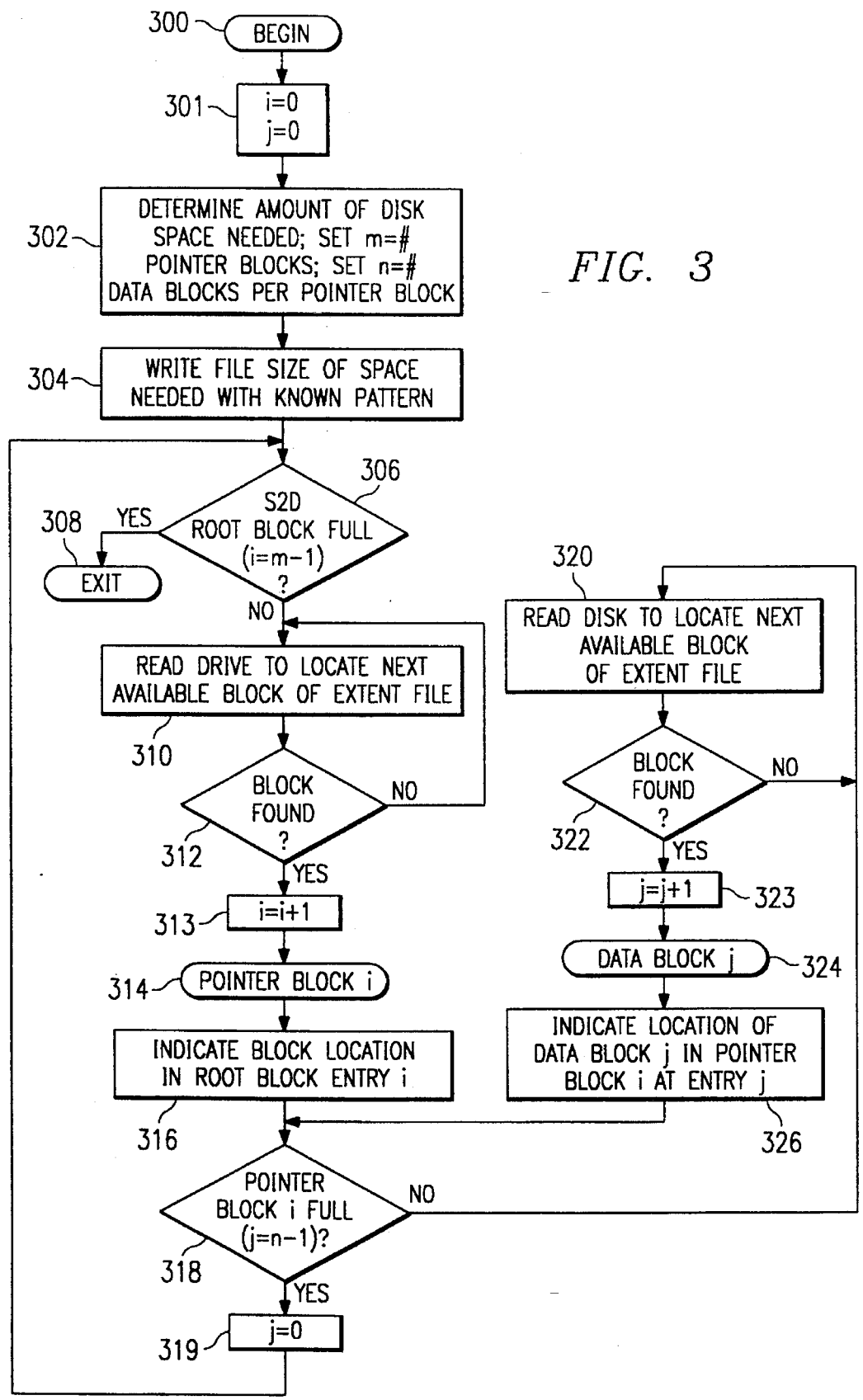
FIG. 3 is a flowchart of the operation of an MKS2D utility of the present invention.

FIG. 3 is a flowchart of the operation of the MKS2D utility of the present invention for creating an extended partition of a size appropriate to accommodate storage of the contents of RAM 14. As indicated above with reference to FIG. 1, instructions for execution by the CPU 12 to implement the MKS2D utility are stored in a storage device connected to the CPU 12. Execution of the MKS2D utility is initiated by a user in step 300, for example, after the size of the RAM 14 is increased or decreased. In step 301, variables i and j, for indicating a current pointer block and current data block, respectively, are initialized to 0. In step 302 a determination is made as to the size of the extended partition necessary to implement S2D operations, taking into account the size of the RAM 14 and the size of the S2D partition 204. Also in step 302, a determination is made as to the number of pointer blocks 232 and data blocks 234 per pointer block needed, which numbers are stored in variables m and n, respectively.

Figure 4:
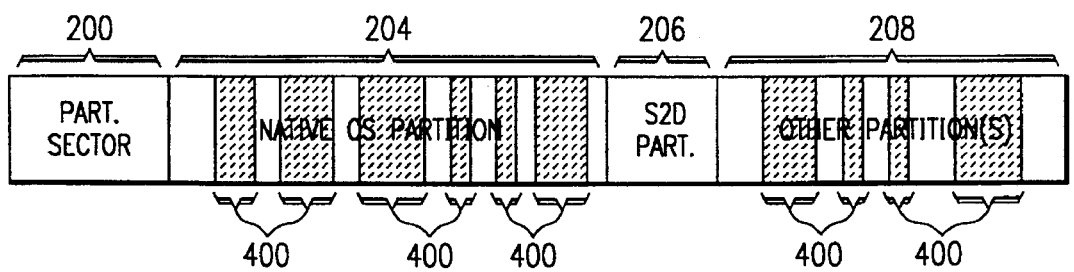
FIG. 4 is a block diagram illustrating an extent file generated by the MKS2D utility of the present invention.

In step 304, the native OS of the PC 12 is used to write an "extent file," which will become the extended partition, of the size determined in step 302 with a known, periodically repetitive pattern. As illustrated in FIG. 4, the extent file 400 may comprise noncontiguous disk space and include disk space located within the native OS partition 202 and other partitions 206, as well as within the S2D partition 204.

Referring again to FIG. 3, in step 306, a determination is made whether the root block 230 has been completely filled in by comparing the value of the variable i with the value stored in the variable m. If so, execution proceeds to step 308, in which execution of the MKS2D utility is terminated. If the root block 230 is not completely filled in, execution proceeds to step 310, in which the hard disk 16 is read to find the next available block of the extent file 400 written in step 304. In step 3 12, a determination is made whether a block has been located. If not, execution returns to step 3 10; otherwise, execution proceeds to step 314. In step 314, the located block is designated as pointer block i. In step 316, a pointer to the physical location of pointer block i on the disk 16 is written to entry i of the root block 230. Execution then proceeds to step 317. In step 317, the variable i is incremented by 1.

In step 318, a determination is made whether pointer block i is completely filled in by comparing the value of the variable j to the value stored in the variable n. If so, execution proceeds to step 3 19, in which the variable j is set to 0, and then returns to step 306 to begin searching for the next pointer block. If pointer block i is not completely filled in, execution proceeds to step 320, in which the disk 16 is read to find the next available block of the extent file 400. In step 322, a determination is made whether a block has been located. If not, execution returns to step 320. In step 324, the located block is designated as data block j. In step 326, a pointer to the physical location of data block j is written to entry j of pointer block i. Execution proceeds to step 327, in which the variable j is incremented by 1. Execution then returns to step 318. In this manner, the root block 230 and pointer blocks 232 are appropriately filled in with pointers to the locations of the pointer blocks 232 and data blocks 234, respectively, on the disk 16.

Figure 5:
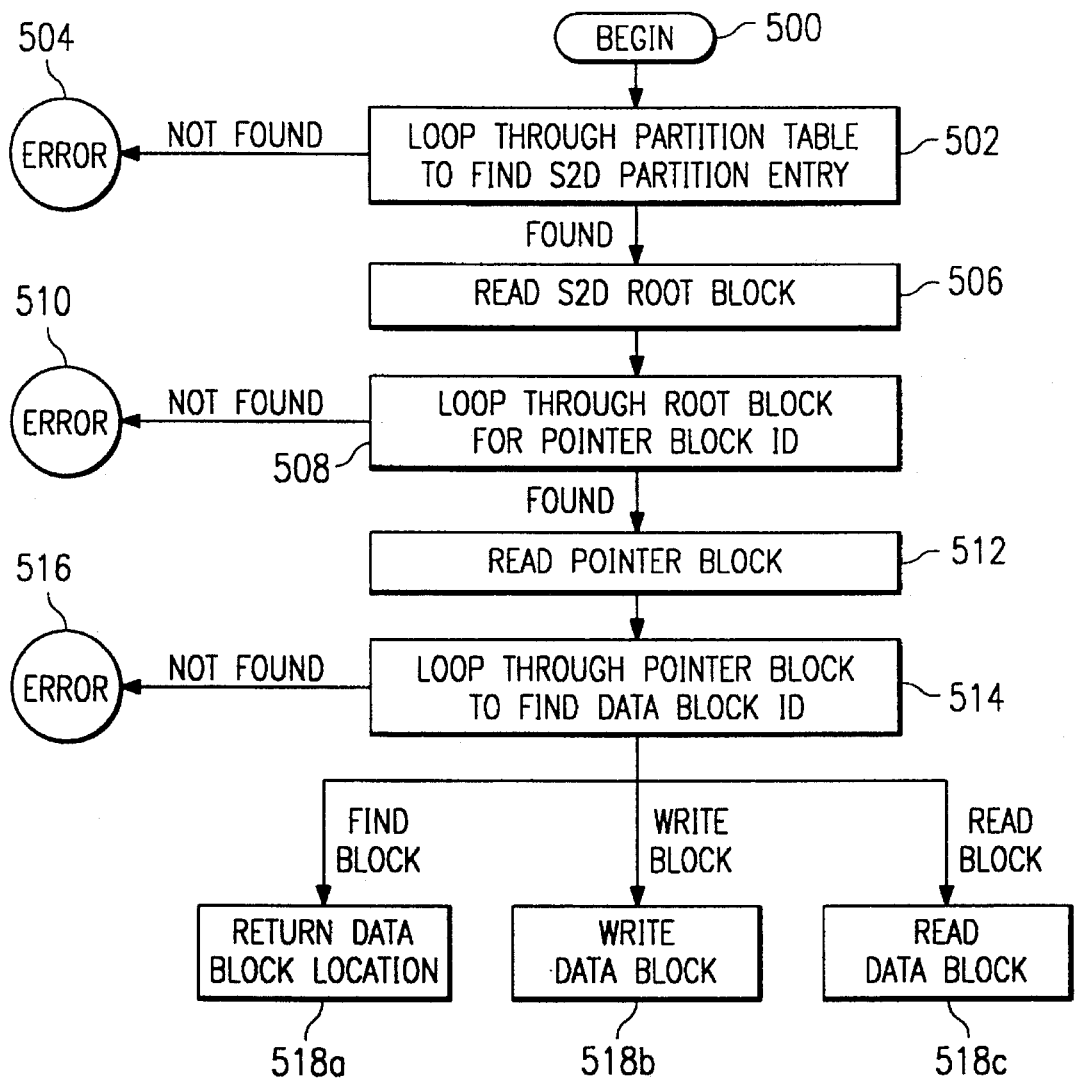
FIG. 5 is a flowchart of the operation of an S2D utility of the present invention.

FIG. 5 is a flowchart of the operation of an exemplary S2D utility for locating a particular data block of the extended file and reading from, writing to, or returning the disk location of the data block. As indicated above with reference to FIG. 1, instructions for execution by the CPU 12 to implement the S2D utility are stored in a storage device connected to the CPU 12. It should be noted that the pointer block entry that points to the desired one of the data blocks is determined by dividing a number designating the desired data block by the number of pointers per pointer block. The resulting quotient and remainder will respectively designate the appropriate pointer block and pointer block entry containing the pointer to the desired data block. For example, referring again to FIG. 2C, the pointer to the data block 14 is located by dividing 14 by the number of pointers per pointer block 232, in this case 4, resulting in a quotient of 3 and a remainder of 2. Accordingly, the pointer to data block 14 is contained in entry 2 of pointer block 3. As previously indicated, a pointer to pointer block 3 is contained in entry 3 of the root block 230.

Referring again to FIG. 5, execution of the S2D utility begins in step 500. In step 502, the utility loops through the partition table (not shown) in the partition sector 200 to locate an S2D partition entry. If an S2D partition entry is not found, execution terminates in step 504; otherwise, execution proceeds to step 506. In step 506, the S2D root block 230 located at the beginning of the S2D partition 204 is read. Assuming that, as described above, the S2D utility is being used to locate data block 14, in step 508, the utility loops through the root block 230 to locate the entry that corresponds to the appropriate pointer block, which in the above example is entry 3. If the entry is not found, execution terminates in step 510; otherwise, execution proceeds to step 512. In step 512, the utility reads the pointer block from the disk 16. In step 514, the utility loops through the pointer block to locate the entry corresponding to the desired data block, which in the above example would be entry 2. If the entry is not found, execution terminates in step 516; otherwise, execution proceeds to step 518a, 518b or 518c, depending on whether the utility is being utilized to return the location of the desired data block, write data to the desired data block, or read data from the desired data block, respectively.

Figure 6:
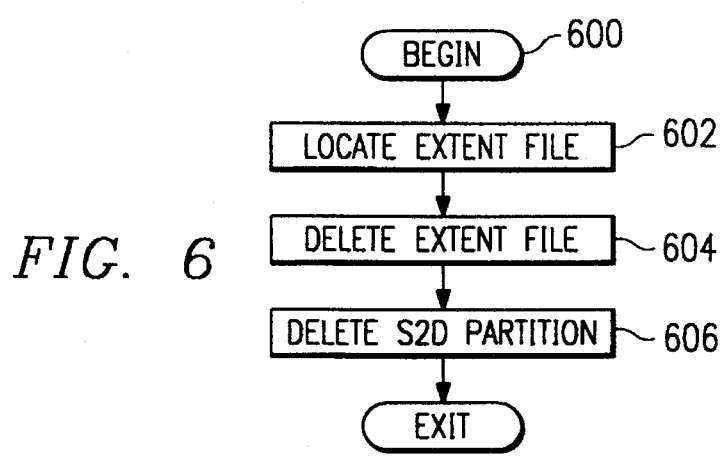
FIG. 6 is a flowchart of the operation of an RMS2D utility of the present invention.

FIG. 6 is a flowchart of the operation of the RMS2D utility of the present invention for removing the extended partition written by the MKS2D utility (FIG. 3), thereby eliminating the capability to perform S2D operations until the MKS2D utility is subsequently run again. As indicated above with reference to FIG. 1, instructions for execution by the CPU 12 to implement the RMS2D utility are stored in a storage device connected to the CPU 12. Operation begins in step 600. In step 602, the extent file 400 created by the MKS2D utility (FIG. 4) in step 304 is located. In step 604, the extent file 400 is deleted. In step 606, the S2D partition 204 is deleted. Operation terminates in step 608.

In operation, the MKS2D utility may be executed at any time by the user, but especially when the size of the RAM 14 has been increased or decreased or after the RMS2D utility has been run and the user again desires to enable S2D functions. As previously indicated, because the size of the S2D partition 204 is very small and because the size and location of the extended partition are adjustable, only that amount of disk space necessary for implementing S2D operations will be reserved for that purpose, with the remainder of the disk 16 available for use by the native OS and other utilities. In addition, the user may at any time selectively disable S2D operations, in which case the entire extended partition will be returned to the native OS partition 202 and/or other partition(s) 206, as appropriate.

It is understood that the present invention can take many forms and embodiments. The embodiments shown herein are intended to illustrate rather than to limit the invention, it being appreciated that variations may be made without departing from the spirit or the scope of the invention. For example, it would be possible to execute the MKS2D and RMS2D utilities, or equivalents thereof, in real time such that MKS2D is executed every time the PC is powered up. Moreover, it would be possible to use a sector other than the partition sector 200 for indicating the location of the S2D and extended partitions. Additionally, many different types of data structures and pointer hierarchies may be used to indicate the location of the extended partition, such as a "root block-to-data block" or a "root block-to-pointer block 1-to-pointer block 2-to data block" structure.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a hard disk electrically connected to a system memory, a method for automatically adjusting an amount of hard disk space needed to implement a suspend-to-disk (S2D) operation, the method comprising:

locating an S2D partition of said hard disk; determining an amount of disk space needed to store the entire contents of said system memory;

locating on said hard disk an amount of available disk space equal to said determined amount, at least a portion of which is external to said S2D partition; and recording in the S2D partition location of said located available disk space.

2. The method of claim 1 wherein said located available disk space comprises an extended partition.

3. The method of claim 2 wherein said S2D partition being of a minimum size necessary for storing a location of said extended partition.

4. The method of claim 1 wherein said locating said amount of disk space comprises:

writing to said hard disk an extent file, wherein a size of said extent file is equal to said determined amount;

reading said hard disk to locate blocks of said extent file; and for each of said located blocks, recording a location of said located block on said hard disk.

5. The method of claim 2 further comprising:

designating in said extended partition a plurality of data blocks for storing contents of said system memory during said S2D operation; creating in said extended partition a plurality of pointer blocks, each pointer block comprising a plurality of pointer block entries each pointing to one of said data blocks; and creating in said S2D partition a root block comprising a plurality of root block entries each pointing to one of said pointer blocks.

6. The method of claim 5 wherein said recording further comprises:

recording in each of said pointer blocks a plurality of pointer block pointers, each of said pointer block pointers identifying a location of one of said data blocks; and recording in said S2D partition a plurality of root block pointers, wherein each of said pointers point to one of said pointer blocks.

7. The method of claim 2 wherein said extended partition comprises noncontiguous memory space.

8. In a computer comprising a hard disk electrically connected to a system memory, a method for automatically adjusting an amount of hard disk space needed to implement a suspend-to-disk (S2D) operation, the method comprising:

responsive to a first command:

determining an amount of hard disk space needed to store contents of said system memory during said S2D operation;

writing to said hard disk an extent file of a size equal to said determined amount with a known pattern;

reading said hard disk to locate a block of said extent file;

writing a pointer to said located block in an S2D partition on said hard disk; and repeating said reading and said writing for all blocks of said extent file; wherein said located blocks comprise an extended partition.

9. The method of claim 8 further comprising, responsive to a second command, writing data stored in said system memory to said located blocks of disk space.

10. The method of claim 8 wherein a first set of said located blocks comprise data blocks and a second set of said located data blocks comprise pointer blocks, said writing further comprising:

for each of said data blocks, writing a pointer to said data block in one of said pointer blocks; and for each of said pointer blocks, writing a pointer to said pointer block in a root block stored in said S2D partition.

11. The method of claim 9 wherein said S2D partition is of a minimum size needed to store a root block.

12. The method of claim 10 further comprising, responsive to a second command, writing said contents of said memory to said data blocks.

13. The method of claim 10 further comprising, responsive to a third command, deleting said extent file and said root block from said hard disk.

14. In a computer comprising a processor, a hard disk and system memory electrically interconnected via a bus, an apparatus for enabling automatic adjustment of an amount of hard disk space needed to implement a suspend-to-disk (S2D) operation, the apparatus comprising:

an S2D partition on said hard disk; and logic executable by said processor for creating an extended partition on said hard disk for storing contents of said system memory during said S2D operation, wherein a size of said extended partition is directly related to a size of said system memory;

wherein said S2D partition comprises a root block including at least one root block entry for identifying a location of said extended partition on said hard disk.

15. The apparatus of claim 14 wherein said logic further comprises logic executable by said processor for determining a required size of said extended partition based on said system memory size.

16. The apparatus of claim 14 further comprising:

logic executable by said processor for designating in said extended partition a plurality of data blocks for storing contents of said system memory during said S2D operation; and logic executable by said processor for creating in said extended partition a plurality of pointer blocks, each pointer, block comprising a plurality of pointer block entries each pointing to one of said data blocks;

wherein said root block comprises a plurality of root block entries each pointing to one of said pointer blocks.

17. The apparatus of claim 14 wherein said logic further comprises:

logic executable by said processor for locating blocks of available space on said hard disk; and logic executable by said processor for reserving said located blocks to said extended partition.

18. The apparatus of claim 14 wherein said extended partition comprises:

a plurality of data blocks for storing contents of said system memory during S2D operations; and a plurality of pointer blocks each comprising a plurality of pointer block entries, each of said pointer block entries pointing to one of said data blocks;

wherein said root block comprises a plurality of root block entries each pointing to one of said pointer blocks.

19. The apparatus of claim 14 wherein said extended partition comprises a plurality of blocks of available space on said hard disk and said root block comprises a plurality of pointers, each of which are for identifying a location of one of said blocks on said hard disk.

20. The apparatus of claim 19 wherein said logic further comprises:

logic executable by said processor for identifying and reserving to said extended partition a number of said blocks for use as data blocks for storing contents of said system memory during S2D operations;

logic executable by said processor for identifying and reserving to said extended partition a number of said blocks for use as pointer blocks;

logic executable by said processor for filling in each of said pointer blocks with a plurality of pointers, each of said pointer block pointers identifying a location of one of said data blocks; and logic executable by said processor for filling in said root block with a plurality of pointers, wherein each of said pointers point to one of said pointer blocks.

21. The apparatus of claim 20 further comprising logic executable by said processor for removing said extended partition from said hard disk.

22. The apparatus of claim 14 wherein said S2D partition is of a minimum size necessary for storing said root block.

23. The apparatus of claim 14 wherein said extended partition comprises noncontiguous hard disk space.

24. The apparatus of claim 14 further comprising a native operating system partition on said hard disk, wherein at least a portion of said extended partition resides in said native operating system partition.

25. In a computer comprising a processor, a hard disk and system memory electrically interconnected via a bus, an apparatus for automatically adjusting an amount of hard disk space needed to implement a suspend-to-disk (S2D) operation, the apparatus comprising:

means for determining an amount of disk space needed to store the entire contents of said system memory;

means for locating on said hard disk an amount of available disk space equal to said determined amount;

means for recording in an S2D partition on said hard drive a location of said located available disk space.

26. The apparatus of claim 25 wherein said located available disk space comprises an extended partition.

27. The apparatus of claim 26 wherein said S2D partition being of a minimum size necessary for storing said extended partition location.

28. The apparatus of claim 25 wherein said locating means comprises:

means for writing to said hard disk an extent file, wherein a size of said extent file is equal to said determined amount;

means for reading said hard disk to locate blocks of said extent file; and means recording a location of each of said located blocks on said hard disk.

29. The apparatus of claim 26 wherein said extended partition comprises noncontiguous disk space.

* * * * *